(12) United States Patent
Yanaros et al.

(10) Patent No.: US 8,328,067 B2
(45) Date of Patent: *Dec. 11, 2012

(54) INERT ENVIRONMENT ENCLOSURE

(75) Inventors: Larry Yanaros, Austin, TX (US);
Frederick Wagner, Georgetown, TX (US)

(73) Assignee: Flextronics AP LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,851

(22) Filed: Jan. 30, 2012

(65) Prior Publication Data
US 2012/0125975 A1     May 24, 2012

Related U.S. Application Data

(63) Continuation of application No. 12/708,908, filed on Feb. 19, 2010, now Pat. No. 8,104,662.

(60) Provisional application No. 61/271,722, filed on Jul. 24, 2009.

(51) Int. Cl.
*B23K 37/00* (2006.01)
*B23K 31/02* (2006.01)

(52) U.S. Cl. ............... 228/8; 228/37; 228/42; 228/260

(58) Field of Classification Search .............. None
See application file for complete search history.

(56) References Cited

U.S. PATENT DOCUMENTS

| | | | |
|---|---|---|---|
| 3,031,802 A | | 5/1962 | Leliaert |
| 3,515,330 A | * | 6/1970 | Johnson et al. ............ 228/8 |
| 4,256,512 A | * | 3/1981 | Ammann et al. ........ 134/64 R |
| 4,321,031 A | * | 3/1982 | Woodgate ................ 432/11 |
| 4,726,506 A | * | 2/1988 | Kondo .................... 228/37 |
| 4,971,083 A | | 11/1990 | Stach et al. |
| 4,997,364 A | * | 3/1991 | McGrath et al. ........... 432/59 |
| 5,048,746 A | * | 9/1991 | Elliott et al. ............ 228/180.1 |
| 5,069,380 A | * | 12/1991 | Deambrosio .............. 228/42 |
| 5,090,651 A | * | 2/1992 | Mittag ................... 228/219 |

(Continued)

FOREIGN PATENT DOCUMENTS

JP    06-194052    7/1994

OTHER PUBLICATIONS

Electrovert DwellMax and DwellMax Plus Product Brochure, Speedline Technologies, 2009.

(Continued)

*Primary Examiner* — Kiley Stoner
(74) *Attorney, Agent, or Firm* — Sheridan Ross P.C.

(57) ABSTRACT

A novel inert environment enclosure includes an object inlet where production objects enter the enclosure and an object outlet where the production objects exit. At least one of the object inlet and the object outlet includes both a top-side flow obstructer and a bottom-side flow obstructer for preventing air from entering the enclosure. In a particular embodiment, the top-side flow obstructer and the bottom-side flow obstructer each include a curtain constructed from a flexible fabric having a plurality of individual adjacent fingers. In another particular embodiment, the inert environment enclosure is a nitrogen hood that houses a wave soldering machine. A inert gas nozzle is mounted at or near the inlet and/or the outlet. The inert environment enclosure maintains a positive pressure with respect to the surrounding environment when production objects are passed through the enclosure.

20 Claims, 10 Drawing Sheets

U.S. PATENT DOCUMENTS

| | | | | |
|---|---|---|---|---|
| 5,121,874 A * | 6/1992 | Deambrosio et al. | | 228/219 |
| 5,121,875 A * | 6/1992 | Hagerty et al. | | 228/219 |
| 5,125,556 A * | 6/1992 | Deambrosio | | 228/42 |
| 5,158,224 A * | 10/1992 | Baker et al. | | 228/37 |
| 5,162,082 A * | 11/1992 | Elliott | | 228/176 |
| 5,176,307 A * | 1/1993 | Hagerty et al. | | 228/37 |
| 5,228,614 A * | 7/1993 | Elliott et al. | | 228/37 |
| 5,230,460 A * | 7/1993 | Deamborsio et al. | | 228/180.1 |
| 5,232,145 A * | 8/1993 | Alley et al. | | 228/102 |
| 5,232,562 A * | 8/1993 | Elliott | | 29/825 |
| 5,240,169 A * | 8/1993 | Gileta | | 228/180.1 |
| 5,297,724 A * | 3/1994 | Mehta et al. | | 228/219 |
| 5,320,274 A * | 6/1994 | Precious et al. | | 228/37 |
| 5,361,969 A * | 11/1994 | Gileta | | 228/180.1 |
| 5,364,007 A * | 11/1994 | Jacobs et al. | | 228/42 |
| 5,397,049 A * | 3/1995 | Gileta et al. | | 228/37 |
| 5,411,200 A * | 5/1995 | Connors et al. | | 228/219 |
| 5,443,382 A * | 8/1995 | Tsurumi et al. | | 432/59 |
| 6,116,491 A | 9/2000 | Katoh | | |
| 6,352,190 B1 * | 3/2002 | Lucht et al. | | 228/37 |
| 6,378,753 B1 * | 4/2002 | Schellen et al. | | 228/37 |
| 2002/0061490 A1 * | 5/2002 | Yamaoka et al. | | 432/152 |
| 2003/0116352 A1 * | 6/2003 | Nakatsuka et al. | | 174/263 |
| 2005/0173497 A1 * | 8/2005 | Dokkedahl | | 228/219 |
| 2007/0045382 A1 * | 3/2007 | Shibamura et al. | | 228/42 |
| 2007/0057020 A1 * | 3/2007 | Shibamura et al. | | 228/101 |
| 2010/0012709 A1 * | 1/2010 | Nikaido et al. | | 228/256 |

OTHER PUBLICATIONS

"Wave Soldering," from Wikipedia, the free encyclopedia, modified Jun. 29, 2009 at 16:24, 8 pages.

PCT Application No. PCT/US2010/002098, International Search Report and Written Opinion dated Oct. 13, 2010.

International Preliminary Report on Patentability for International (PCT) Patent Application No. PCT/US2010/002098, mailed Feb. 2, 2012 10 pages.

Official Action for U.S. Appl. No. 12/708,908, mailed Apr. 19, 2011.

Notice of Allowance for U.S. Appl. No. 12/708,908, mailed Sep. 1, 2011.

Official Action for U.S. Appl. No. 13/361,851, mailed Apr. 9, 2012 11 pages.

* cited by examiner

INERT ENVIRONMENT ENCLOSURE

RELATED APPLICATIONS

This application is a Continuation of U.S. patent application Ser. No. 12/708,908, filed Feb. 19, 2010, now U.S. Pat. No. 8,104,662 which said application claims the benefit of U.S. Provisional Patent Application No. 61/271,722, filed Jul. 24, 2009 by the same inventors, which are incorporated herein by reference in their entirety.

BACKGROUND OF THE INVENTION

1. Field of the Invention

This invention relates generally to manufacturing equipment, and more particularly to inert environment enclosures. Even more particularly, the invention relates to a feature for improving the performance of inert environment enclosures.

2. Description of the Background Art

In the electronics manufacturing industry, large-scale soldering processes and devices are currently being used to solder electrical components onto production objects such as, for example, printed circuit boards (PCB's). Typically, PCB's include multiple plated through-holes (PTHs), which receive the leads of electrical components that are to be soldered. Electrical components are typically mounted on the top surface of the PCB such that the leads pass through the PTHs and are exposed from the bottom surface of the PCB.

One process, commonly known in the art as "wave soldering", enables several electrical joints to be soldered in a short period of time. Wave soldering typically involves passing multiple production boards through a wave soldering machine by way of a conveyor system. Production boards are either loaded directly onto the conveyor system, or multiple production boards are arranged onto a pallet that is loaded onto the conveyor system. As production boards move along the conveyor, they undergo a sequence of processes. For example, after entering the machine, the production board passes over a fluxer which applies a layer of flux onto it's bottom surface. Then, the production board passes over a heater where it is preheated to prevent thermal shock caused by sudden exposure to molten solder. After being preheated, the entire bottom surface of the production board passes over a wave of molten solder, which is projected upward via a solder nozzle. The molten solder contacts the entire bottom surface, then forms joints on any areas not covered by soldermask. The solder nozzle is supplied by a solder reservoir, which also catches any of the molten solder that does not stick. Any solder that returns to the reservoir mixes with the other molten solder and is eventually re-projected from the nozzle.

Although conventional wave soldering machines can solder several joints relatively quickly, there are drawbacks. For example, oxygen in the air reacts with the solder to form oxides (e.g., tin-oxide, lead-oxide, etc.) which accumulate on the solder nozzle and other machine components. The oxides block solder flow and, therefore, must be removed to achieve acceptable soldering. Of course, the removal of the oxides requires preventative maintenance (PM) and, therefore, equipment and manufacturing downtime. In addition, oxide formation consumes valuable solder that must be continuously replaced with new solder. As yet another drawback, oxides create environmentally hazardous materials (i.e. lead oxide).

In effort to decrease the problems caused by oxide formation, equipment manufacturers have designed wave soldering machines that operate within inert environment enclosures such as, for example, nitrogen hoods. A nitrogen hood is basically a large nitrogen filled enclosure constructed around a machine to prevent air from contacting its components. A typical nitrogen hood includes an inlet for receiving unsoldered production boards, and an outlet where finished products exit.

Although conventional nitrogen hoods help reduce the amount of oxygen within a workspace, problems still exist. For example, air can enter into conventional hoods through both the inlet and the outlet.

In an effort to decrease the problems associated with conventional nitrogen hoods, equipment manufacturers have designed nitrogen hoods with inlet and outlet curtains. Such curtains are mounted over the inlet and outlet openings to reduce air flow through the openings while also allowing production boards to move therethrough. When production boards are not being moved into or out of such hoods, the curtains hang downward to prevent air from entering. As conveyors guide production boards through the inlet or outlet, the curtains brush the top surface of the production boards to form a light "seal" between the top of the opening and the top of the production object.

Although such curtains help prevent air from entering when production boards are not being moved into or out of the hood, air still enters the hood when the machine is in use. As production objects pass into, or out of, the hood, the curtains are lifted thereby permitting the flow of air under the bottom-side of the production object.

What is needed, therefore, is an inert environment enclosure that reduces the amount of air and/or any other potentially unwanted gases that enter the enclosure when production objects are passed therethrough.

SUMMARY

The present invention overcomes the problems associated with the prior art by providing an inert environment enclosure that includes features for reducing the amount of gas that can enter the enclosure from the local surrounding environment.

According to an example embodiment of the present invention, an inert environment enclosure includes a wall defining an interior and an exterior of the enclosure, at least one gas inlet that is coupled to provide gas to the interior of the enclosure, an object inlet through which production objects enter the enclosure, and an object outlet through which production objects exit the enclosure. At least one of the object inlet and the object outlet includes a top-side flow obstructer and a bottom-side flow obstructer for inhibiting gases from the exterior of the enclosure from entering the interior of the enclosure. The top-side flow obstructer is adapted to contact top surfaces of the production objects and the bottom-side flow obstructer is adapted to contact the opposite bottom surfaces of the production objects.

In an example embodiment, the gas inlet is positioned at one of the object inlet and the object outlet. The enclosure further includes a flow controller for controlling the flow of gas through the gas inlet. The flow of gas through the gas inlet is controlled so as to maintain a positive pressure in the interior of the enclosure with respect to the exterior of the enclosure. In a particular embodiment, the flow controller provides a substantially continuous flow of gas through the gas inlet to maintain the positive pressure, even when production objects are being passed through the enclosure. In a disclosed embodiment, the gas inlet is positioned at the object outlet. A flow meter allows a user to control the flow of gas through the gas inlet and into the object outlet. In an alternative embodiment, the gas inlet is positioned at the object inlet and a second gas inlet is positioned at the object outlet. Optionally, the gas inlet is a gas nozzle coupled to an inert gas (e.g., nitrogen) source and is operative to discharge the inert gas into the enclosure.

In a disclosed embodiment, the enclosure includes a guide system for guiding production objects into the enclosure through the object inlet and out of the enclosure through the object outlet. In a specific embodiment, the guide system includes a set of tracks disposed through the object inlet and the object outlet. The production objects are carried through the enclosure on pallets which are operative to carry multiple production objects (e.g., PCB's) at once. In one example embodiment, the guide system is a conveyor system.

In a disclosed embodiment, at least one of the top-side flow obstructer and the bottom-side flow obstructer includes a flexible material adapted to slidably contact passing production objects. In an example embodiment, the flexible material is composed of a fabric. In an even more particular embodiment, the fabric includes fluorocarbon and can withstand temperatures exceeding 300 degrees Fahrenheit. In another more particular embodiment, the fabric is a part of the bottom-side flow obstructer. The fabric is flexible enough to be deflected downward when urged by passing production objects, yet possesses sufficient elasticity to return to an upright position after the production objects pass. In one embodiment, the flexible material is arranged in at least one row transverse to a travel direction of the production objects. Optionally, the flexible material is arranged in a plurality of rows transverse to the travel direction of the production objects. The flexible material includes a first separation defining at least a first finger and an adjacent second finger. The first finger deflects independently from the second adjacent finger. Each row includes a first layer and an abutting second layer of the flexible material.

In an example embodiment, at least one of the top-side flow obstructer and the bottom-side flow obstructer includes a first plate for mounting the flexible material. The flexible material includes a mounting portion and a free portion. The mounting portion is fixably mounted with respect to the first plate. The free portion is adapted to slidably contact passing production objects. The first plate includes a first surface, an opposite second surface, and an opening passing through both the first surface and the second surface. The flexible material is positioned through the opening such that the first surface of the plate faces the free portion of the flexible material and the second surface of the plate faces the mounting portion of the flexible material. In a more particular embodiment, the flow obstructer also includes a second plate that has a first surface and an opposite second surface. The second plate is fixed to the first plate such that the second surface of the first plate faces the first surface of the second plate. Further, the mounting portion of the flexible material is sandwiched between the second surface of the first plate and the first surface of the second plate.

In a disclosed embodiment, the top-side flow obstructer includes a free portion adapted to slidably contact the top surfaces of production objects passing between the top-side flow obstructer and the bottom-side flow obstructer. Likewise, the bottom-side flow obstructer includes a free surface adapted to slidably contact the bottom surfaces of the production objects passing between the top-side flow obstructer and the bottom-side flow obstructer. The free portion of the top side flow obstructer and the free portion of the bottom side flow obstructer are adapted to contact one another when production objects are not being passed between the top-side flow obstructer and the bottom-side flow obstructer.

In a more particular embodiment, the object inlet includes a top-side flow obstructer and a bottom-side flow obstructer, and the object outlet includes a top-side flow obstructer and a bottom-side flow obstructer. The bottom-side flow obstructer of the object inlet includes a free portion adapted to slidably contact the bottom surfaces of production objects passing between the bottom-side flow obstructer and the first top-side flow obstructer of the first object inlet. Likewise, the top-side flow obstructer of the object inlet includes a free portion adapted to slidably contact top surfaces of the production objects passing between the bottom-side flow obstructer and the first top-side flow obstructer of the object inlet. The free portion of the top-side flow obstructer and the free portion of the bottom-side flow obstructer of the object inlet are adapted to contact one another when production objects are not being passed between the bottom-side flow obstructer and the top-side flow obstructer of the object inlet.

Similarly, the bottom-side flow obstructer of the object outlet includes a free portion adapted to slidably contact the bottom surfaces of the production objects passing between the bottom-side flow obstructer and the top-side flow obstructer of the object outlet. The top-side flow obstructer of the object outlet includes a free portion adapted to slidably contact the top surfaces of production objects passing between the bottom-side flow obstructer and the top-side flow obstructer of the object outlet. The free portion of the top-side flow obstructer of the object outlet and the free portion of the bottom side flow obstructer of the object outlet are adapted to contact one another when production objects are not being passed between the bottom-side flow obstructer and the top-side flow obstructer of the object outlet.

In an example embodiment, the inert environment enclosure is a nitrogen hood. In a more particular embodiment, the nitrogen hood is adapted to receive wave soldering equipment.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an inert environment enclosure having a bottom-side flow obstructer and a top-side flow obstructer mounted over an inlet and/or an outlet of the enclosure. In the following description, numerous specific details are set forth (e.g., conveyor system, nitrogen hood, wave soldering equipment, etc.) in order to provide a thorough understanding of the invention. Those skilled in the art will recognize, however, that the invention may be practiced apart from these specific details. In other instances, details of well known wave soldering practices (e.g., preheating, fluxing, soldering, etc.) and components have been omitted, so as not to unnecessarily obscure the present invention. Although the present invention is described in the context of a wave soldering hood, it should be understood that the invention can be implemented with any known processes that ordinarily take place in a hood.

Figure 1:
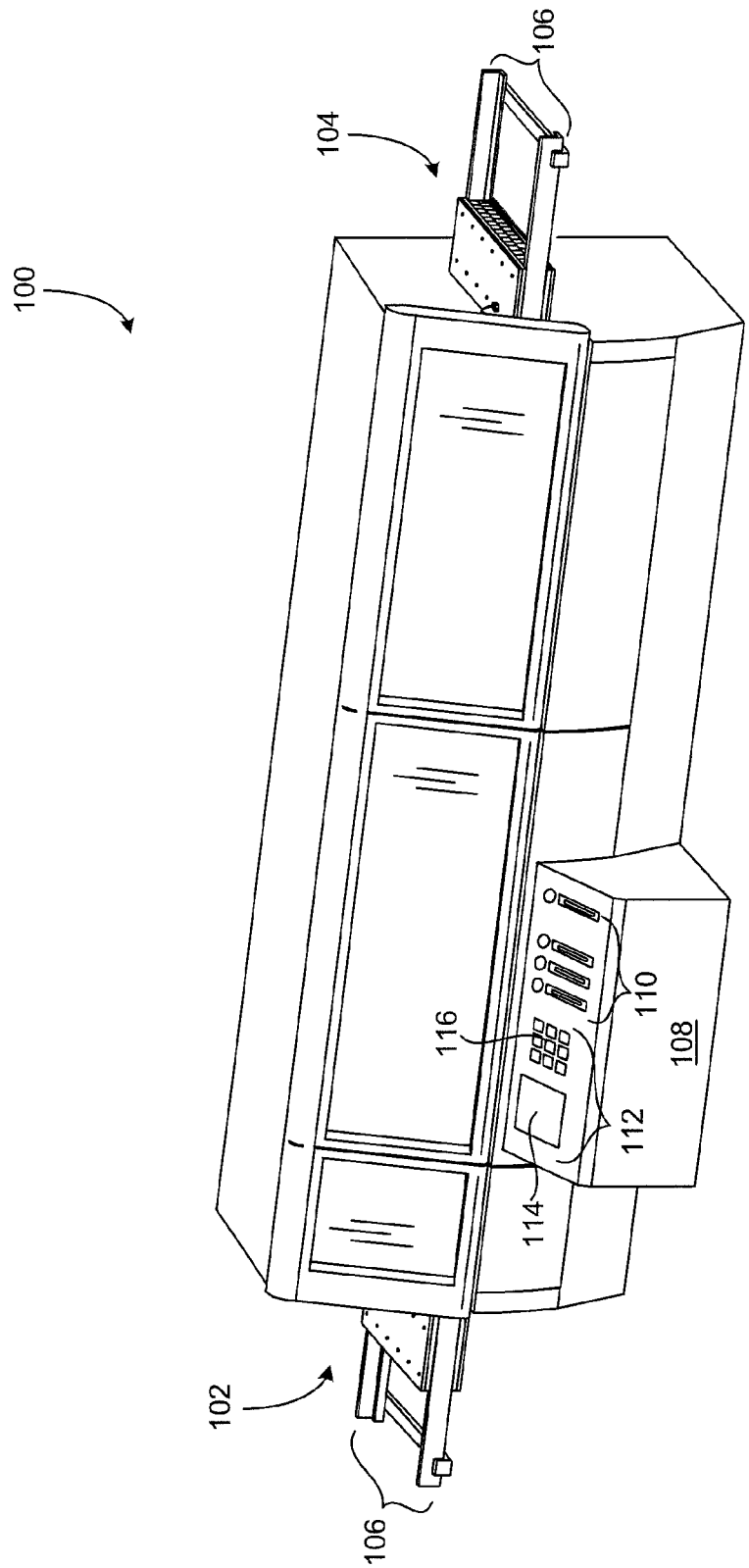
FIG. 1 shows a perspective view of a nitrogen hood 100.

FIG. 1 shows a perspective view of a wave soldering nitrogen hood 100 according to one embodiment of the present invention. Hood 100 includes an inlet 102, an outlet 104, a set of conveyor tracks 106, and a control panel 108. Inlet 102 and outlet 104 provide passageways through which production objects (e.g., circuit boards) enter and exit, respectively, hood 100. Tracks 106 provide a means for guiding production objects through hood 100. Tracks 106 extend through inlet 102, passed process equipment (i.e., flux sprayers, heaters, solder wave generating device), and through outlet 104. Production objects can be transported along tracks 106 either manually or automatically by any suitable means such as, for example, motorized chains, belts, rollers, gears, etc. Further, the production objects can be carried along tracks 106 either directly, or on a pallet. Control panel 108 provides user control and monitoring of various functions and operating conditions of hood 100. Indeed, control panel 108 includes a set of flow meters 110 and a user input/output interface 112. Flow meters 110 facilitate the control and monitoring of nitrogen levels at various locations within hood 100. Further, at least one of flow meters 110 facilitates the control and monitoring of nitrogen in outlet 104. The nitrogen gas used by hood 100 during production can be supplied by any suitable source such as, for example, refillable/removable onboard nitrogen tanks, nitrogen hoses connected to a remote nitrogen source, etc. User input/output interface 112 represents any suitable device or devices that facilitate communication between a user and hood 100. For example, interface 112 includes a display screen 114 for providing information such as operating conditions (e.g., internal oxygen levels, internal pressure levels, temperature, etc.), user settings, etc. Interface 112 also includes a plurality of user-input devices 116 which represent any suitable means (e.g., buttons, switches, knobs, etc.) for receiving user-inputs.

One important feature of hood 100 is that it can operate at a positive gage pressure during production. That is, when operating at positive gage pressure, the pressure inside hood 100 is greater than the pressure outside of hood 100. Of course, the gage pressure is increased by increasing the flow of nitrogen gas into hood 100. By operating at a positive gage pressure, the amount of air that can enter hood 100 is substantially reduced because nitrogen gas continuously flows from the high pressure interior of hood 100 to the surrounding low pressure atmosphere. Thus, the pressure difference causes nitrogen gas to flow continuously out of hood 100 through any small openings that could otherwise permit atmospheric air to pass therethrough. Not only can hood 100 operate at a positive gage pressure, hood 100 can also maintain a positive gage pressure either automatically or manually. As a means for maintaining a positive gage pressure, hood 100 could employ an automatic control system that maintains a predetermined set of operating condition. For example, the control system could include a computer system electrically coupled to an electronic pressure indicator and an electrically actuated nitrogen valve. The computer system could continuously sample electrical pressure readings indicative of the pressure within hood, and then compare the readings to a predetermined set of values that could be either user defined or preprogrammed. In response to a reading that does not satisfy a predetermined condition, the computer system could actuate the nitrogen valve until sufficient gage pressure is achieved. That is, nitrogen flow could be increased or decreased when gage pressure readings become too high or low, respectively. Optionally, the automatic control system could also include various other types of sensors (e.g., thermometers, light sensors, electrical charge sensors, oxygen sensors, nitrogen sensors, etc.) and process devices (e.g., vent actuators, exhaust pumps/fans, heating/cooling elements, light sources, etc.) coupled to the computer to facilitate the automatic control and monitoring of various other operating conditions within hood 100. As another means for maintaining a positive gage pressure, pressure within hood 100 could be controlled manually by simply incorporating a valve that, when actuated, maintains a continuous flow rate of nitrogen into hood 100. The valve could be either a variable flow rate valve, or a simple open/close type valve. It is known to those skilled in the art that the term "gage pressure" refers to the pressure in a system relative to the local atmospheric pressure when the system pressure is greater than the local atmospheric pressure. Conversely, the term "vacuum pressure" refers to the pressure in a system relative to the local atmospheric pressure when the system pressure is less than the local atmospheric pressure.

Figure 2:
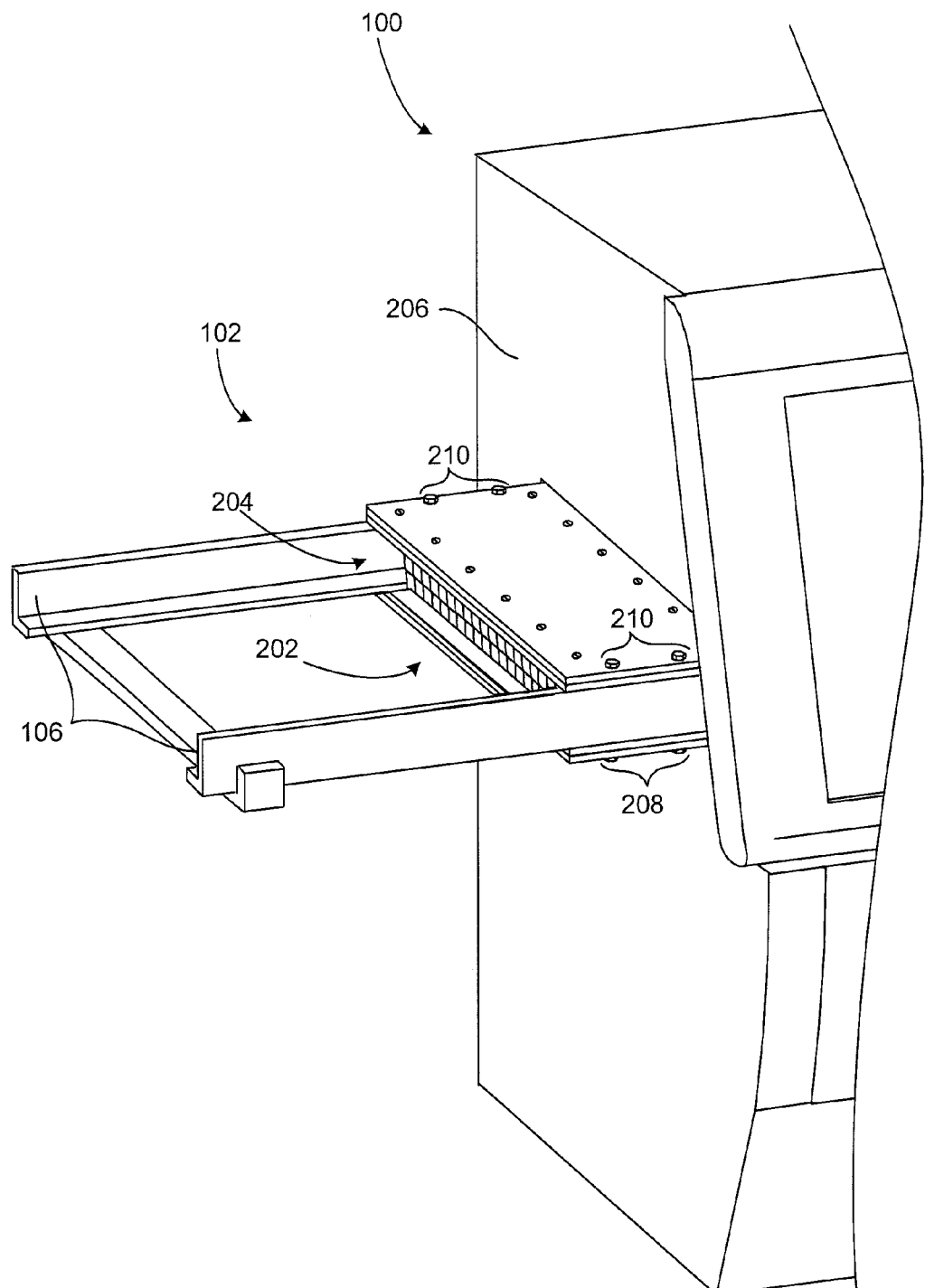
FIG. 2 shows a perspective view of an inlet 102 of nitrogen hood 100 shown in FIG. 1.

FIG. 2 shows a perspective view of inlet 102 including additional features not visible in FIG. 1. Inlet 102 includes an opening 200 (shown in FIG. 6), a bottom-side flow obstructer 202, and a top-side flow obstructer 204. Opening 200 is formed through a sidewall 206 of hood 100 and provides a passageway through which production objects are guided into hood 100 along tracks 106. Bottom-side flow obstructer 202 is mounted to the bottom of tracks 106 via a set of screws 208. Likewise, top-side flow obstructer 204 is mounted on the top of tracks 106 via a set of screws 210. Bottom-side flow obstructer 202 and top-side flow obstructer 204 are mounted facing one another from opposite sides of tracks 106 such that bottom-side flow obstructer 202 and top-side flow obstructer 204 simultaneously contact the top and bottom surfaces, respectively, of the production objects as they enter the hood. This contact prevents air from entering hood 100 as the production objects are passed through opening 200. During times when production objects are not being passed through opening 200, bottom-side flow obstructer 202 and top-side flow obstructer 204 contact one another to prevent air from entering into hood 100. In addition to preventing air from entering hood 100, bottom-side flow obstructer 202 and top-side flow obstructer 204 reduce the flow of nitrogen out of hood 100. By reducing the flow of nitrogen out of hood 100, less nitrogen is required to increase or maintain gage pressures. As previously mentioned, an increase in gage pressure further prevents the passage of air into hood 100 because gas flows from the high pressure within hood 100 to the relative low pressure of the local atmosphere outside of hood 100.

Figure 3:
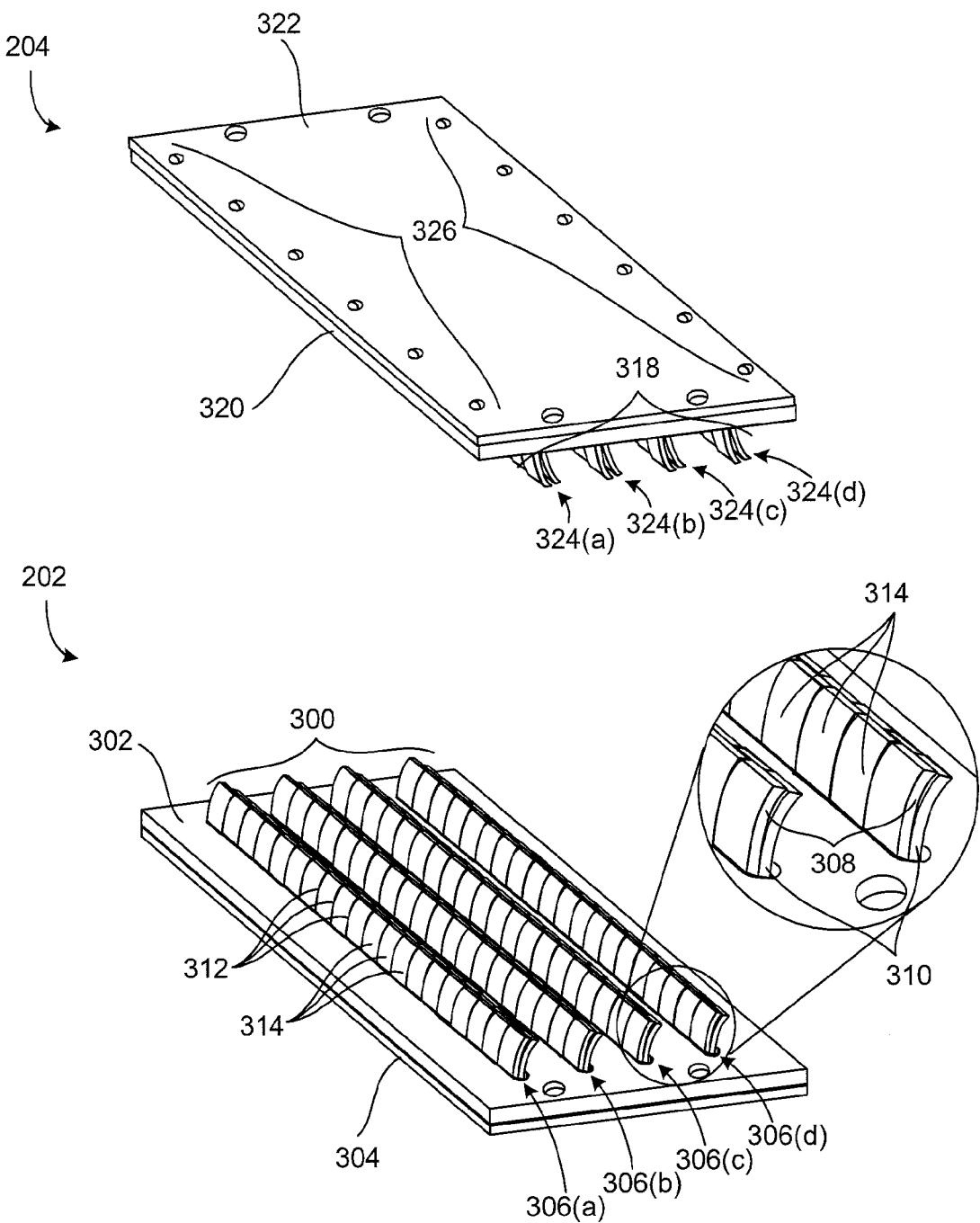
FIG. 3 shows a perspective view of a bottom-side flow obstructer 202 and a top-side flow obstructer 204 of inlet 102.

FIG. 3 shows a perspective view of bottom-side flow obstructer 202 and top-side flow obstructer 204 including additional features not visible in FIGS. 1-2. Bottom-side flow obstructer 202 includes a set of curtains 300, a mounting plate 302, and a cover plate 304. Curtains 300 are mounted on plate 302 in an upright position such that the top of curtains 300 slidably contact the bottom surfaces of passing production objects. Curtains 300 are composed of soft flexible fabric that is easily deflected when urged by passing production objects. In addition to being soft and flexible, the fabric has enough rigidity to maintain a light contact with the bottom surfaces of passing production objects and to allow curtains 300 to return to back to an upright position after being deflected. Although curtains 300 could be constructed from various types of fabrics and materials (e.g., bristles), the inventors have found that good results are achieved when the curtains are constructed from a polytetrafluoroethylene (i.e. Teflon) coated fabric that is electrostatic discharge (ESD) safe and resistant to temperatures exceeding 300 F. Curtains 300 are arranged in four parallel rows 306(a-d) extending along the entire width of opening 200 (shown in FIG. 6). Each of rows 306(a-d) include a first layer 308 and an overlapping second layer 310, each of which include a plurality of vertical slices 312 defining a plurality of adjacent fingers 314. Slices 312 formed on first layer 308 are horizontally offset from slices 312 formed on second layer 310 so as to minimize air leakage between fingers 314. Each of fingers 314 is free to deflect independently from neighboring fingers such that curtains 300 can adapt to the various sizes and element configurations of different production objects. As production objects pass through inlet 102, fingers 314 deflect downward and gently sweep the bottom surfaces of the objects to form a light seal therebetween.

Mounting plate 302 is, for example, an aluminum plate that facilitates the mounting of curtains 300. The mounting of curtains 300 is further facilitated by cover plate 304 which is mounted to the bottom surface of mounting plate 302 via a set of screws 316 (visible in FIG. 4). Note that additional features and functionalities of mounting plate 302 and cover plate 304 will be described in further detail in view of upcoming FIG. 4.

Top-side flow obstructer 204 includes a set of curtains 318, a mounting plate 320, and a cover plate 322. Curtains 318 are mounted on plate 320 in a downward position facing curtains 300 such that the bottoms of curtains 318 slidably contact the top surfaces of passing production objects. Further, curtains 318 are arranged into four rows 324(a-d) that contact rows 306(a-d), respectively, when objects are not being passed into hood 100. Mounting plate 320 and cover plate 322 facilitate the mounting of curtains 318. Also, plates 320 and 322 are fixed together via a set of screws 326. The features and functionalities of curtains 318, plate 320, and plate 322 are substantially similar to the features and functionalities of curtains 300, plate 302, and plate 304, respectively. Therefore, in-depth details of curtains 318, plate 320, and plate 322 are omitted from the following description to avoid redundancy.

Figure 4:
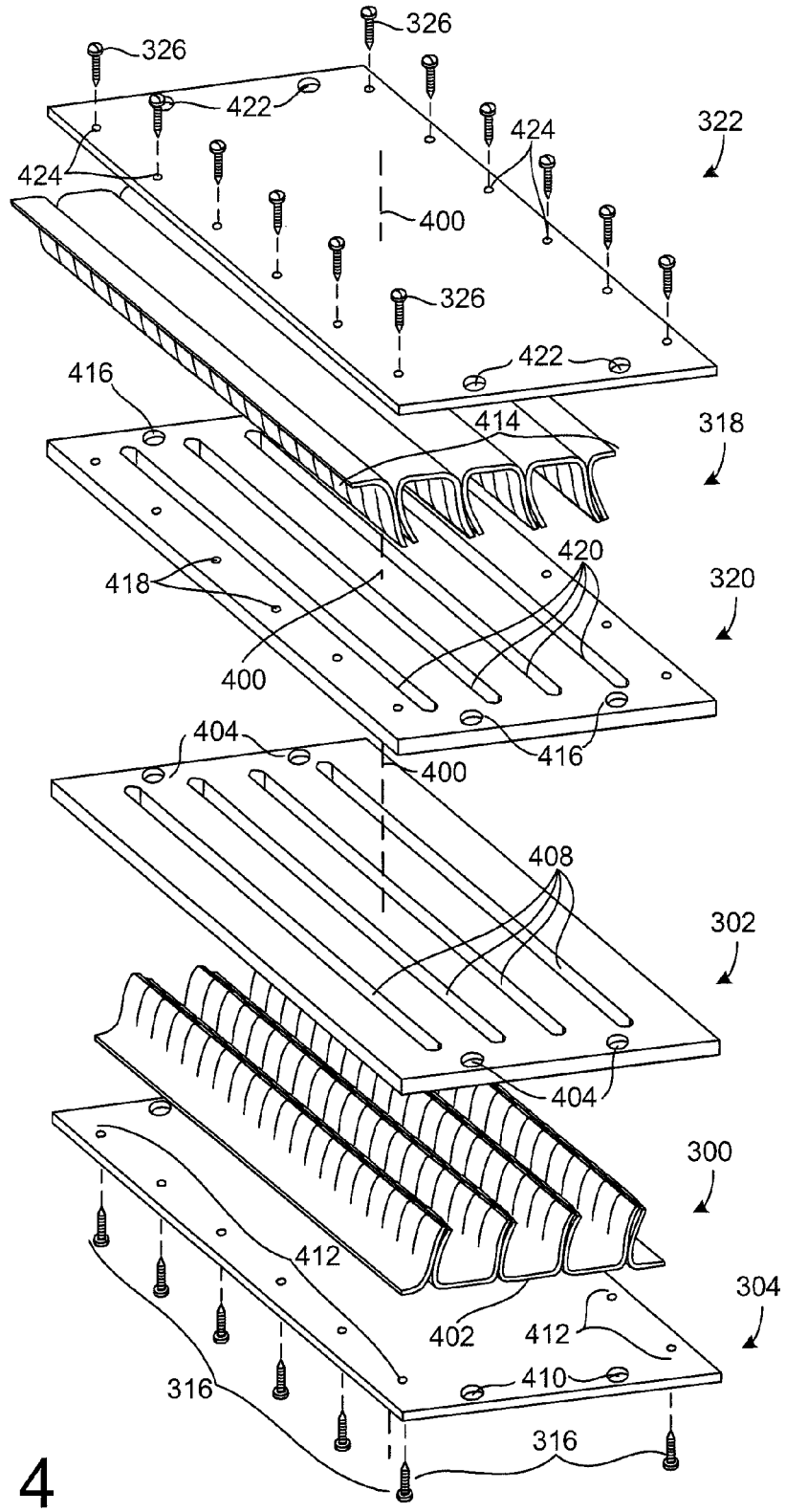
FIG. 4 shows an exploded view of bottom-side flow obstructer 202 and top-side flow obstructer 204.

FIG. 4 shows a perspective view of bottom-side flow obstructer 202 and top-side flow obstructer 204 exploded along an axis 400 to show additional features of curtains 300, mounting plate 302, cover plate 304, curtains 318, mounting plate 320, and cover plate 322. Curtains 300 further include a mounting portion 402 that facilitates the mounting of curtains 300 to plate 302. Plate 302 includes a set of through-holes 404, a set of threaded screw holes 406 (not visible), and four parallel slots 408. Through-holes 404 are openings formed completely through plate 302, each of which receives a respective one of screws 208 during the mounting of bottom-side flow obstructer 202 to the bottom of tracks 106. Each of screw holes 406 receives a respective one of screws 316 during the mounting of cover plate 304 to mounting plate 302. Each of slots 408 is an elongated opening formed completely through plate 302 and is adapted to receive a respective one of rows 306(a-d). Cover plate 304 includes a set of through holes 410 and a second set of through-holes 412. Each of through-holes 410 is coaxially aligned with a respective one of through-holes 404 so as to receive a respective one of screws 208 during the mounting of bottom-side flow obstructer 202 to the bottom of tracks 106. Each of through-holes 412 is coaxially aligned with a respective one of screw holes 406 to receive a respective one of screws 316 during the mounting of cover plate 304 to mounting plate 302.

Curtains 318 further include a mounting portion 414 that facilitates the mounting of curtains 318 to plate 320. Plate 320 includes a set of through-holes 416, a set of threaded screw holes 418, and four parallel slots 420. Through-holes 416 are openings formed completely through plate 320, each of which receives a respective one of screws 210 during the mounting of top-side flow obstructer 204 to the top of tracks 106. Each of screw holes 418 receives a respective one of screws 326 during the mounting of cover plate 322 to mounting plate 320. Each of slots 420 is an elongated opening formed completely through plate 320 and is adapted to receive a respective one of rows 324(a-d). Cover plate 322 includes a set of through-holes 422 and a second set of through-holes 424. Each of through-holes 422 is coaxially aligned with a respective one of through-holes 416 so as to receive a respective one of screws 210 during the mounting of top-side flow obstructer 204 to the top of tracks 106. Each of through-holes 424 is coaxially aligned with a respective one of screw holes 418 to receive a respective one of screws 326 during the mounting of cover plate 322 to mounting plate 320.

Figure 5:
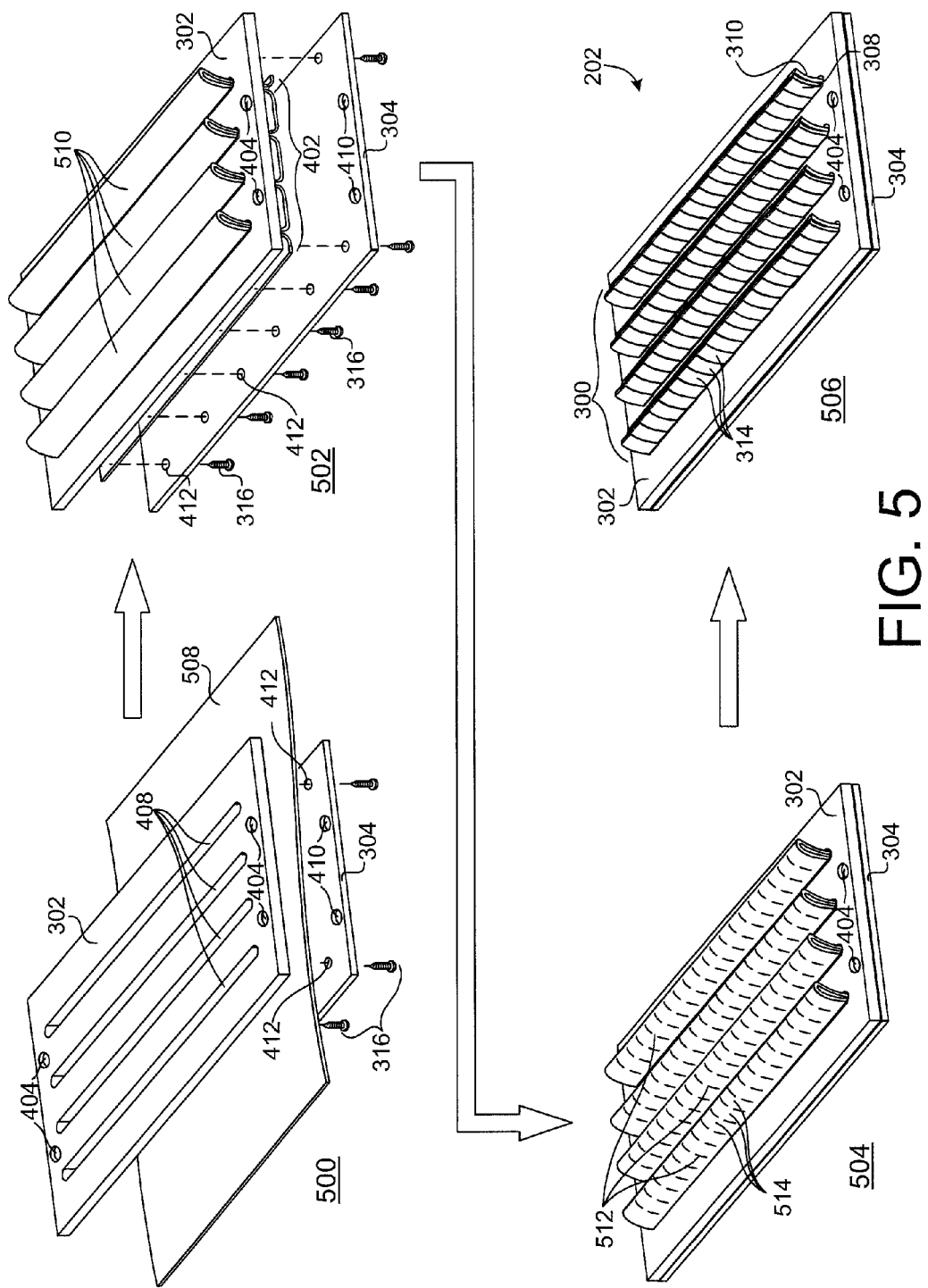
FIG. 5 depicts the construction of bottom-side flow obstructer 202.

FIG. 5 depicts several stages for assembling bottom-side flow obstructer 202 according to one embodiment of the present invention. The assembly stages are summarized into a first stage 500, a second stage 502, a third stage 504, and a fourth stage 506. In first stage 500, a single uniform sheet of fabric 508, mounting plate 302, cover plate 304, and screws 316 are provided. Then, in second stage 502, fabric 508 is weaved into and out of each of slots 408 so as to form loops 510 of fabric extending along each respective slot 408. At this point of assembly it should be recognized that each of loops 510 forms an individual one of rows 306(a-d). Next, in third stage 504, cover plate 304 is tightly mounted to plate 302 via screws 316 such the mounting portion 502 is tightly sandwiched and, therefore, fixed between plates 304 and 302. Once screws 316 tightened, each loop 510 is sliced vertically along lines 512 so as to form a plurality of individual adjacent loops 514. Finally, in fourth stage 506, the crest of each individual loop 514 is sliced horizontally such that each loop 514 is separated into two individual abutting fingers 314, one of which is part of first layer 308 while the other is part of second layer 310.

Figure 6:
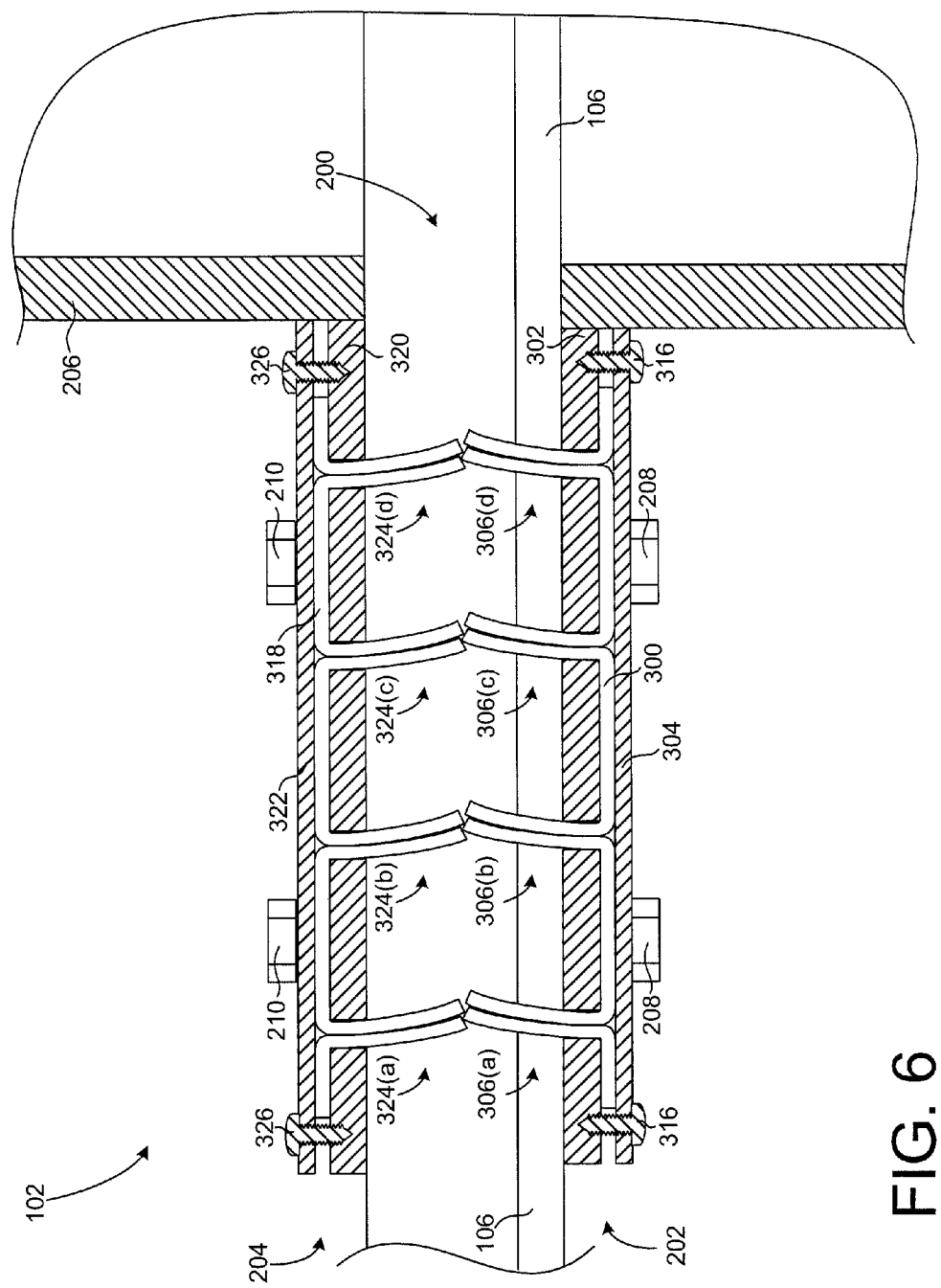
FIG. 6 shows a cross-sectioned view of inlet 102.

FIG. 6 shows a cross-sectional view of inlet 102 when production objects are not being passed into hood 100. Accordingly, when no production objects are being passed into hood 100 curtains 300 remain in an upright position while curtains 318 remain in a downward position such that rows 306(a-d) remain in contact with rows 324(a-d), respectively. Although continuous contact is maintained between each of rows 306(a-d) and respective rows 324(a-d) simultaneously, contact between only one out of the four sets of respective rows would be sufficient to prevent air from entering hood 100. Thus, in order for air to enter through opening 200, failure to make contact at each of rows 306(a-d) and respective rows 324(a-d) would have to occur simultaneously. Even if such an unlikely situation occurred, the positive gage pressure within hood 100 would cause a continuous discharge of nitrogen gas out of opening 200 to prevent the air from entering into hood 100.

Not only do curtains 300 and 318 prevent air from entering opening 200 when objects are not being passed into hood 100, but also when objects are being passed into hood 100. For example, when a production object first enters inlet 102, it pushes row 306(a) and row 324(a) inward and away from one another while rows 306(b-d) and 324(b-d), respectively, remain in contact. As rows 306(a) and 324(a) are forced to deflect inward, rows 306(a) and 324(a) simultaneously contact the bottom and top surfaces, respectively, of the production object as it passes. Any air that might leak through rows 306(a) and 324(a) is prevented from entering any further by the remaining contacting rows 306(b-d) and 324(b-d). Likewise, rows 306(b-d) and 324(b-d) sequentially deflect inward and form a light seal with the bottom and top surfaces, respectively, of the production object as it moves forward. It is likely that horizontal length of passing production objects will be greater than the horizontal length of inlet 102 such that all of rows 306(a-d) and 324(a-d) will be simultaneously deflected at the same time. However, air flow is still prevented from entering through opening 200 because of the positive gage pressure within hood 100 and the horizontal distance between the curtain rows. The distance between each row reduces air flow into hood 100 because as fingers of one row are deflected by a part of the production object, fingers of another row, previously deflected by the part, will likely be returning to a position that inhibits air flow.

Figure 7:
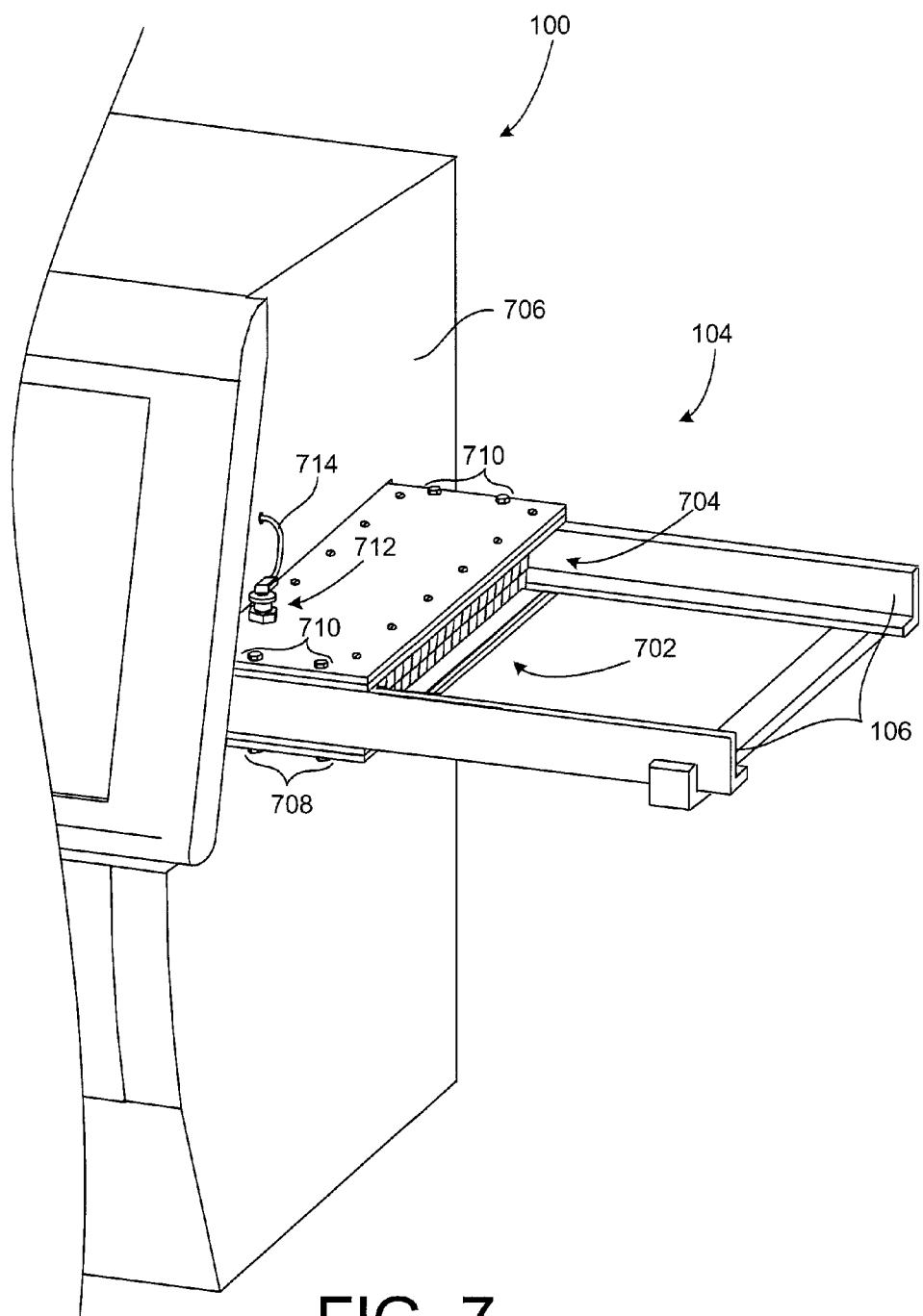
FIG. 7 shows a perspective view of an outlet 104 of nitrogen hood 100.

FIG. 7 shows a perspective view of outlet 104 including additional features not visible in FIG. 1. Outlet 104 includes an opening 700 (shown in FIG. 11), a bottom-side flow obstructer 702, and a top-side flow obstructer 704. Opening 700 is formed through a sidewall 706 of hood 100 and provides a passageway through which production objects are guided out of hood 100 along tracks 106. Bottom-side flow obstructer 702 is mounted to the bottom of tracks 106 via a set of screws 708. Likewise, top-side flow obstructer 704 is mounted on the top of tracks 106 via a set of bolts 710. Bottom-side flow obstructer 702 and top-side flow obstructer 704 are mounted facing one another from opposite sides of tracks 106 such that bottom-side flow obstructer 702 and top-side flow obstructer 704 simultaneously contact the top and bottom surfaces, respectively, of the production objects as they exit hood 100. This contact prevents air from entering hood 100 as the production objects exit through outlet 104. If no production objects are exiting hood 100, bottom-side flow obstructer 702 and top-side flow obstructer 704 contact one another to prevent air from entering into hood 100. In addition to preventing air from entering hood 100, bottom-side flow obstructer 702 and top-side flow obstructer 704 reduce the flow of nitrogen out of hood 100.

In this particular embodiment, hood 100 further includes a nitrogen nozzle 712 mounted on top-side flow obstructer 704. Nitrogen nozzle 712 provides a means for feeding nitrogen gas directly into outlet 104 to further prevent air from entering hood 100. Nitrogen gas is fed to nozzle 712 via a nitrogen feed line 714 which is shown passing through wall 706. Although feed line 714 is shown passing through wall 706, it could carry nitrogen from any suitable nitrogen source regardless if the source is positioned inside or outside hood 100. The control and monitoring of nitrogen flow through nozzle 712 is facilitated by at least one of flow meters 110 (shown in FIG. 1). It should be noted that nozzle 712 generically represents any suitable means for providing a controlled discharge of gas. However, the inventors have achieved good results using a Chand Eisenmann Metallurgical porous sintered, 316 stainless steel nozzle.

Figure 8:
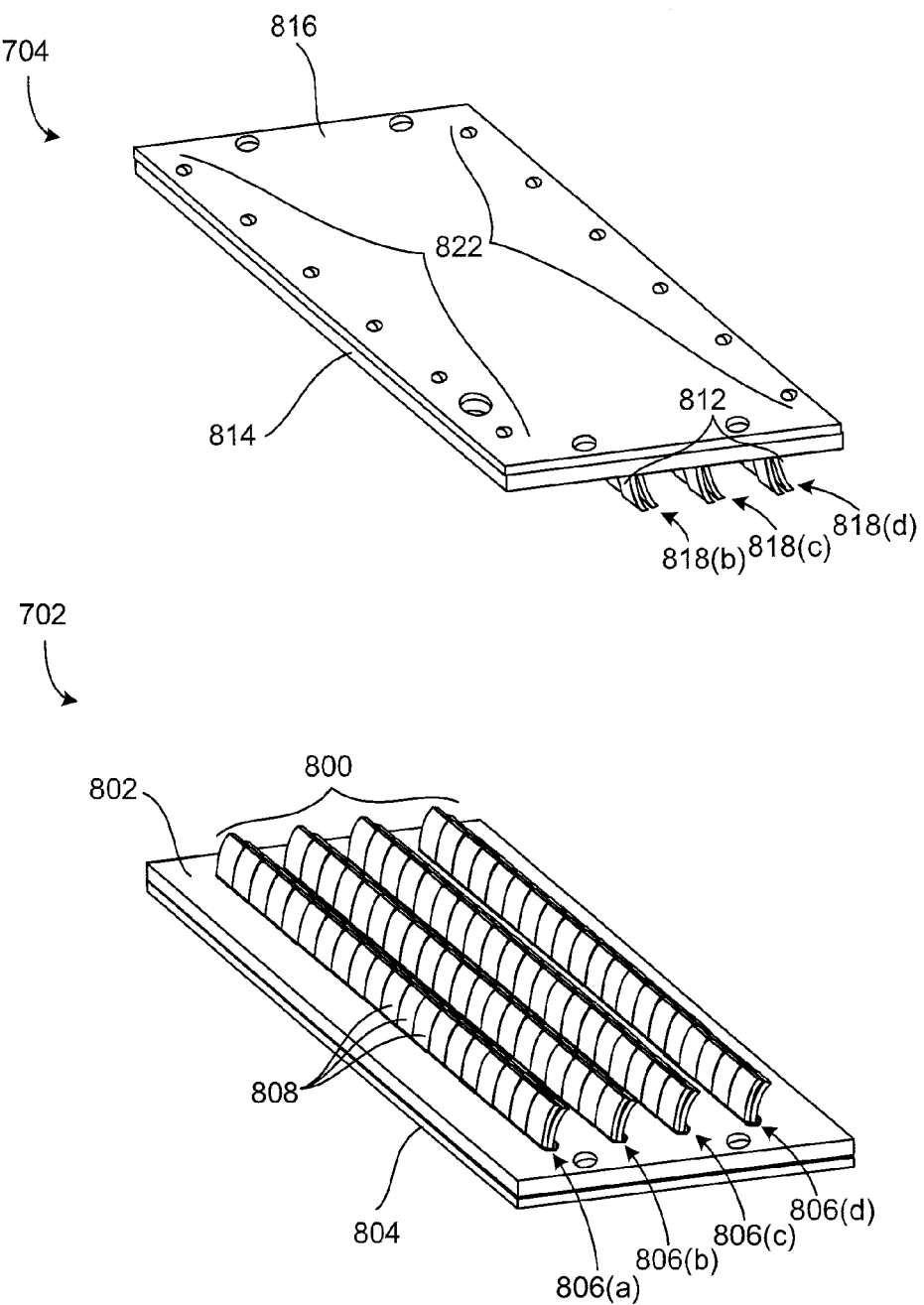
FIG. 8 shows a perspective view of a bottom-side flow obstructer 702 and a top-side flow obstructer 704 of outlet 104.

FIG. 8 shows a perspective view of bottom-side flow obstructer 702 and top-side flow obstructer 704 including additional features not visible in FIG. 7.

Bottom-side flow obstructer 702 includes a set of curtains 800, a mounting plate 802, and a cover plate 804. Curtains 800 are arranged in four parallel rows 806(a-d), each of which include a plurality of adjacent fingers 808. As production objects exit outlet 104, fingers 808 deflect downward and gently sweep the bottom surfaces of the objects to form a light seal therebetween. Mounting plate 802 and cover plate 804 facilitate the mounting of curtains 800 and are mounted together via a set of screws 810 (shown in FIG. 10). It should be noted that the features of bottom-side flow obstructer 702 are substantially similar to those of bottom-side flow obstructer 202 and top-side flow obstructer 204. Therefore, many specific details associated with the features of bottom-side flow obstructer 702 are omitted from the following description to avoid redundancy.

Top-side flow obstructer 704 includes a set of curtains 812, a mounting plate 814, and a cover plate 816. Curtains 812 are mounted on plate 814 in a downward position facing curtains 800 such that the bottoms of curtains 812 slidably contact the top surfaces of passing production objects. Further, curtains 812 are arranged into three rows 818(b-d) that contact rows 806(b-d), respectively, when objects are not exiting hood 100. Each of rows 818(b-d) include a plurality of adjacent fingers 820 (shown in FIG. 9). Mounting plate 814 and cover plate 816 facilitate the mounting of curtains 812. The mounting of curtains 812 is further facilitated by a set of screws 822 which provide a means for fastening plates 814 and 816 together while portions of curtains 812 are sandwiched therebetween.

Figure 9:
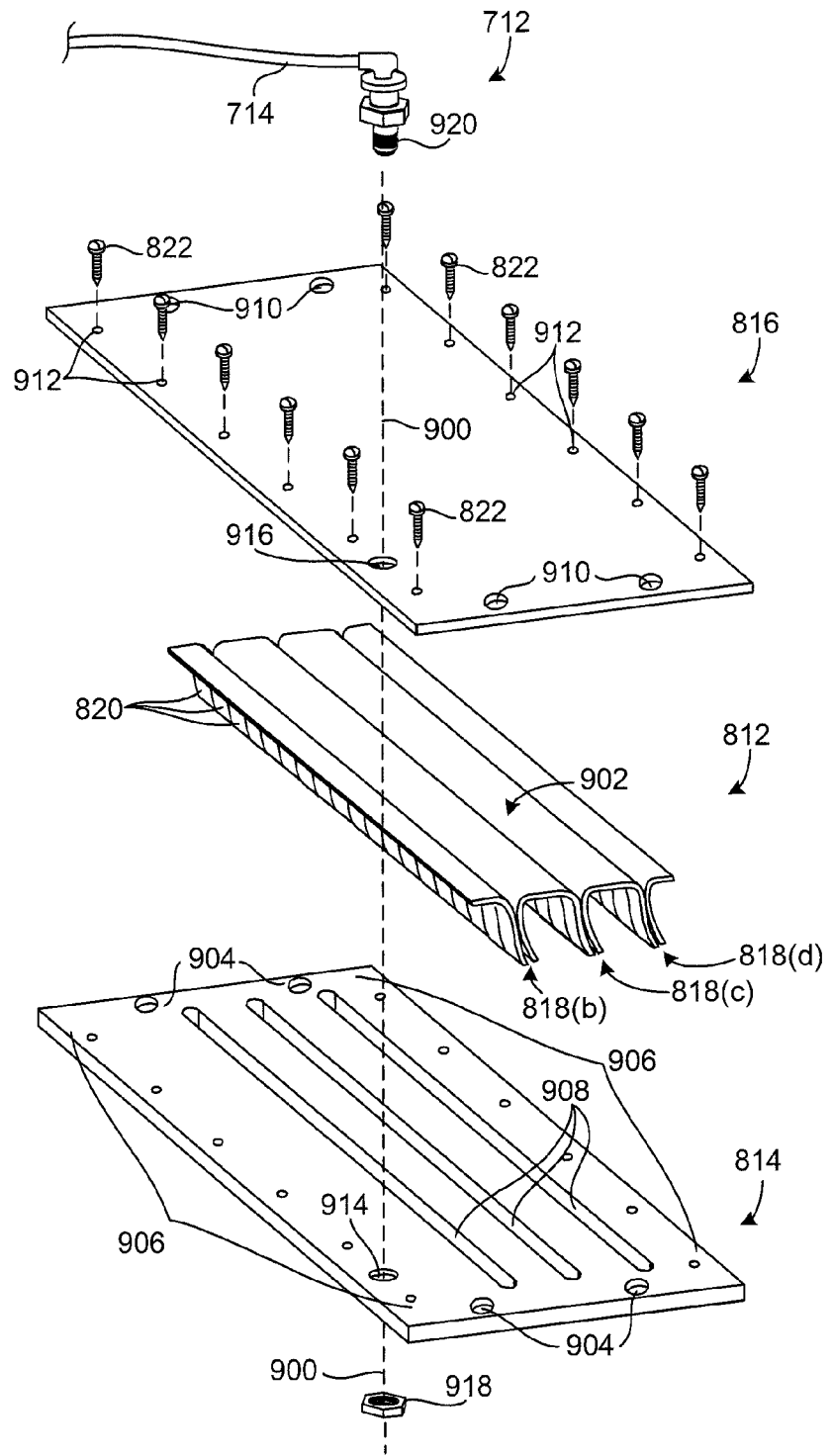
FIG. 9 shows an exploded view of top-side flow obstructer 704 and nozzle 712.

FIG. 9 shows a perspective view of curtains 812, mounting plate 814, cover plate 816, and nozzle 712 exploded along an axis 900.

Curtains 812 further include a mounting portion 902 which gets sandwiched tightly between plates 814 and 816 during mounting. In this particular embodiment, curtains 812 are constructed from the same type of fabric used to construct curtains 300, 318, and 800. However, the material used to construct one curtain need not necessarily be the same as the material used to form another curtain. For example, curtains 812 could be formed from material that is more flexible than that used to form curtains 800 because, unlike curtains 800, curtains 812 do not deflect downward and, therefore, do not have to overcome gravity when returning to their original position.

Plate 814 includes a set of through-holes 904, a set of threaded screw holes 906, and three parallel slots 908. Through-holes 904 are openings formed completely through plate 814 to receive a respective one of bolts 710 during the mounting of top-side flow obstructer 704 to the top of tracks 106. Each of screw holes 906 receives a respective one of screws 822 during the mounting of cover plate 816 to mounting plate 814. Each of slots 908 is an elongated opening formed completely through plate 814 and is adapted to receive a respective one of rows 818(b-d).

Cover plate 816 includes a set of through-holes 910 and a second set of through-holes 912. Each of through-holes 910 is coaxially aligned with a respective one of through-holes 904 so as to receive a respective one of bolts 710 during the mounting of top-side flow obstructer 704 to the top of tracks 106. Each of through-holes 912 is coaxially aligned with a respective one of screw holes 906 to receive a respective one of screws 822 during the mounting of cover plate 816 to mounting plate 814.

Plates 814 and 816 further include through-holes 914 and 916, respectively, to facilitate the mounting of nozzle 712. Through-holes 914 and 916 are coaxially aligned with respect to axis 900 so as to form an opening through top-side flow obstructer 704 when plates 814 and 816 are fastened to one another. Once nozzle 712 is positioned within the opening, it is mounted in a fixed position via a nut 918 that threads onto a complementary set of threads 920 formed on nozzle 712. Although not shown, it is likely that some suitable type of gas flow obstructer (e.g., o-rings, gaskets, etc.) would also be used when mounting nozzle 712.

Figure 10:
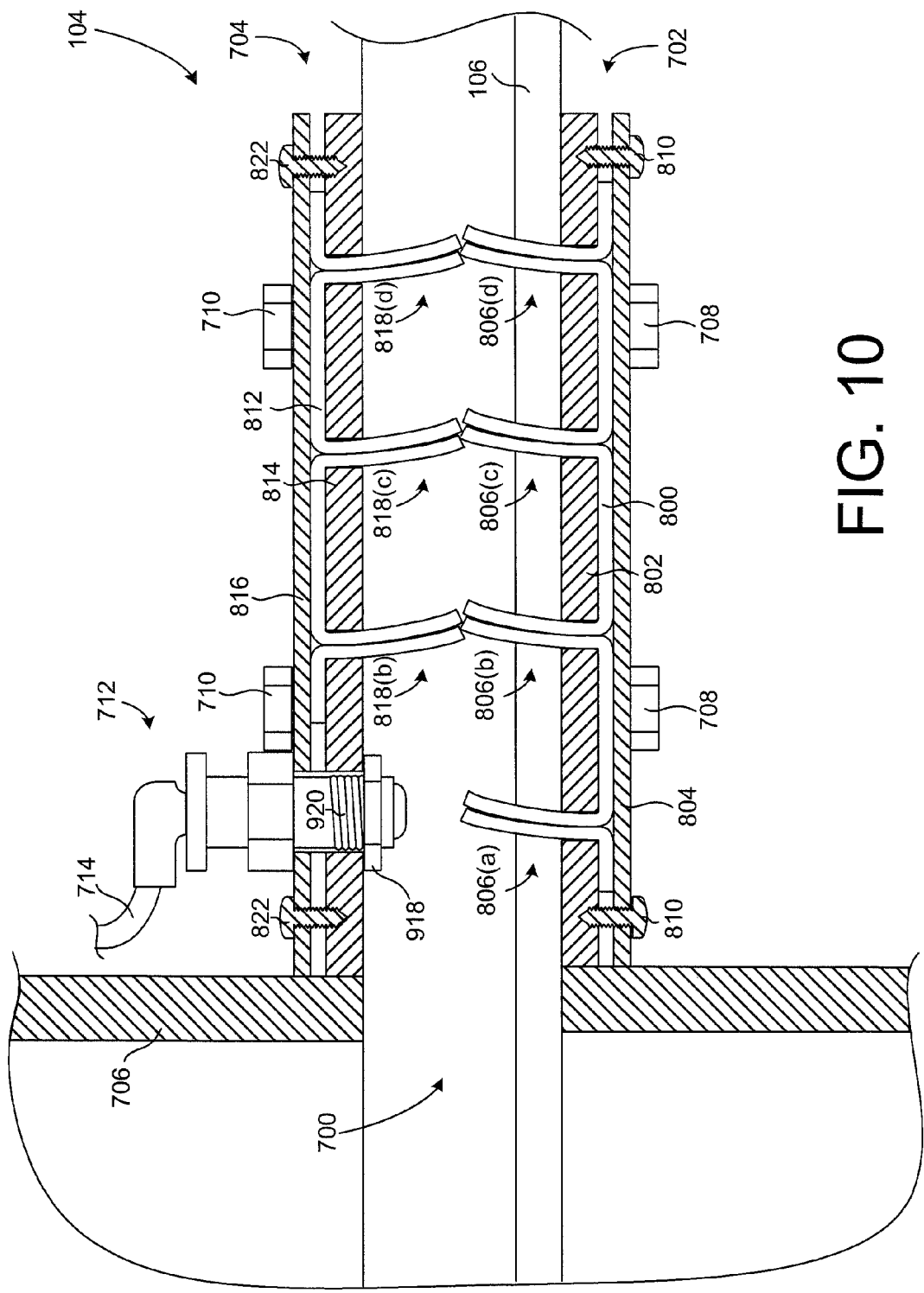
FIG. 10 shows a cross-sectioned view of outlet 104.

FIG. 10 shows a cross-sectional view of outlet 104 when production objects are not exiting hood 100. Accordingly, when no production objects are exiting hood 100, curtains 800 remain in an upright position while curtains 812 remain in a downward position such that rows 806(*b-d*) remain in contact with rows 818(*b-d*), respectively. In this particular embodiment, the functionalities of curtains 800 and 812 are substantially similar to that of curtains 300 and 318, the only difference being that curtains 812 have three rows rather than four. Instead of having a fourth row, nozzle 712 is mounted above row 806(*a*).

The description of particular embodiments of the present invention is now complete. Many of the described features may be substituted, altered or omitted without departing from the scope of the invention. For example, alternate flow-obstructing elements (e.g., bristles), may be substituted for any of curtains 300, 318, 800, and 812. As another example, alternate inerting gas (e.g., helium, argon, etc.), may be substituted for the nitrogen gas. These and other deviations from the particular embodiments shown will be apparent to those skilled in the art, particularly in view of the foregoing disclosure.

We claim:

1. An inert environment enclosure comprising:
    a wall defining an interior of said enclosure and an exterior of said enclosure;
    at least one gas inlet coupled to said wall, said gas inlet configured to provide gas to said interior of said enclosure;
    at least one sensor coupled to a control system, the at least one sensor operative to indicate a pressure in said interior of said enclosure, the control system operative to control a pressure in said interior of said enclosure;
    an object inlet through which production objects enter said enclosure;
    an object outlet through which said production objects exit said enclosure; wherein said enclosure substantially encloses wave soldering equipment; and
    wherein at least one of said object inlet and said object outlet includes a top-side flow obstructer and a bottom-side flow obstructer for inhibiting gases from the exterior of said enclosure from entering said interior of said enclosure, said top-side flow obstructer being adapted to contact top surfaces of said production objects, said bottom-side flow obstructer being adapted to contact bottom surfaces of said production objects.

2. An inert environment enclosure according to claim 1, wherein the control system is operable to maintain a positive pressure in said interior of said enclosure with respect to said exterior of said enclosure.

3. An inert environment enclosure according to claim 2, further comprising at least one flow controller operative to control a flow of gas through the at least one gas inlet;
    wherein the control system actuates the flow controller to maintain a positive pressure in said interior of said enclosure with respect to said exterior of said enclosure.

4. An inert environment enclosure according to claim 2, further comprising at least one electrically actuated valve;
    wherein the control system actuates the at least one electrically actuated valve.

5. An inert environment enclosure according to claim 4, wherein the control system actuates the at least one electrically actuated valve in response to an indication from the at least one sensor.

6. An inert environment enclosure according to claim 5, wherein the control system maintains a positive pressure in said interior of said enclosure even when a production object enters or exits said enclosure.

7. An inert environment enclosure according to claim 2, wherein the control system maintains a positive pressure in said interior of said enclosure even when a production object enters or exits said enclosure.

8. An inert environment enclosure according to claim 2, wherein said gas inlet is coupled to provide said gas from an inert gas source.

9. An inert environment enclosure according to claim 8, wherein said inert gas source is a nitrogen gas source.

10. An inert environment enclosure according to claim 2, wherein said at least one gas inlet is disposed at one of said object inlet and said object outlet.

11. An inert environment enclosure according to claim 2, further comprising a guide system operative to guide production objects into said enclosure through said object inlet and out of said enclosure through said object outlet.

12. An inert environment enclosure according to claim 11, wherein said guide system includes a set of tracks disposed through said object inlet and said object outlet.

13. An inert environment enclosure according to claim 12, wherein said set of tracks is operative to guide pallets through said enclosure, said pallets being operative carry production objects thereon.

14. An inert environment enclosure according to claim 2, wherein at least one of said top-side flow obstructer and said bottom-side flow obstructer includes a flexible material adapted to slidably contact production objects.

15. An inert environment enclosure according to claim 14, wherein
    said flexible material is a part of said bottom-side flow obstructer,
    said flexible material deflects downward when urged by passing production objects, and
    said flexible material has sufficient elasticity to return to an upright position after being deflected downward by said production objects.

16. An inert environment enclosure according to claim 2, further comprising at least one of a thermometer, light sensor, electrical charge sensor, oxygen sensor, nitrogen sensor.

17. An inert environment enclosure comprising:
    a wall defining an interior of said enclosure and an exterior of said enclosure;
    at least one gas inlet coupled to said wall, said gas inlet configured to provide gas to said interior of said enclosure; wherein said enclosure substantially encloses wave soldering equipment;
    an object inlet through which production objects enter said enclosure;
    an object outlet through which said production objects exit said enclosure;
    at least one pressure sensor coupled to a control system, the pressure sensor operative to indicate a pressure in said interior of said enclosure with respect to said exterior of said enclosure;
    at least one flow controller operative to control a flow of gas through the at least one gas inlet;
    wherein the control system actuates the flow controller to maintain a positive pressure in said interior of said enclosure with respect to said exterior of said enclosure; and
    wherein at least one of said object inlet and said object outlet includes flow obstructer for inhibiting gases from the exterior of said enclosure from entering said interior of said enclosure above and below said production objects.

18. An inert environment enclosure comprising:
a wall defining an interior of said enclosure and an exterior of said enclosure;
at least one gas inlet coupled to said wall, said gas inlet configured to provide gas to said interior of said enclosure;
an object inlet through which production objects enter said enclosure;
an object outlet through which said production objects exit said enclosure;
at least one pressure sensor coupled to a control system, the pressure sensor operative to indicate a pressure in said interior of said enclosure with respect to said exterior of said enclosure;
at least one electrically actuated valve coupled to said at least one gas inlet;
wherein the control system actuates the at least one electrically actuated valve to maintain a positive pressure in said interior of said enclosure with respect to said exterior of said enclosure; wherein said enclosure substantially encloses wave soldering equipment;
wherein at least one of said object inlet and said object outlet includes a top-side flow obstructer and a bottom-side flow obstructer for inhibiting gases from the exterior of said enclosure from entering said interior of said enclosure, said top-side flow obstructer being adapted to contact top surfaces of said production objects, said bottom-side flow obstructer being adapted to contact bottom surfaces of said production objects; and
wherein at least one of said top-side flow obstructer and said bottom-side flow obstructer includes a flexible material adapted to slidably contact production objects.

19. An inert environment enclosure according to claim 18, wherein
said flexible material is a part of said bottom-side flow obstructer,
said flexible material deflects downward when urged by passing production objects, and
said flexible material has sufficient elasticity to return to an upright position after being deflected downward by said production objects.

20. An inert environment enclosure according to claim 18, wherein said at least one gas inlet is disposed atone of said object inlet and said object outlet.

* * * * *

UNITED STATES PATENT AND TRADEMARK OFFICE
CERTIFICATE OF CORRECTION

| | | |
|---|---|---|
| PATENT NO. | : 8,328,067 B2 | Page 1 of 1 |
| APPLICATION NO. | : 13/361851 | |
| DATED | : December 11, 2012 | |
| INVENTOR(S) | : Larry E. Yanaros and Frederick W. Wagner | |

It is certified that error appears in the above-identified patent and that said Letters Patent is hereby corrected as shown below:

In the Abstract, line 12, replace "A inert" with --An inert--.

Claim 20, Column 14, line 22, replace "atone" with --at one--.

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,328,067 B2
APPLICATION NO.   : 13/361851
DATED             : December 11, 2012
INVENTOR(S)       : Larry E. Yanaros and Frederick W. Wagner It is certified that error appears in the above-identified patent and that said Letters Patent is hereby corrected as shown below:

Title Page, Item (57) Abstract, line 12, replace "A inert" with --An inert--.

In the Claims:

Claim 20, Column 14, line 22, replace "atone" with --at one--.

This certificate supersedes the Certificate of Correction issued April 2, 2013.

Signed and Sealed this
Twenty-third Day of April, 2013

Teresa Stanek Rea
*Acting Director of the United States Patent and Trademark Office*